(12) United States Patent
Novoselsky et al.

(10) Patent No.: US 10,698,953 B2
(45) Date of Patent: *Jun. 30, 2020

(54) EFFICIENT XML TREE INDEXING STRUCTURE OVER XML CONTENT

(75) Inventors: Anguel Novoselsky, Foster City, CA (US); Zhen Hua Liu, San Mateo, CA (US); Thomas Baby, Maple Valley, WA (US)

(73) Assignee: Oracle International Corporation, Redwood Shores, CA (US)

( * ) Notice: Subject to any disclaimer, the term of this patent is extended or adjusted under 35 U.S.C. 154(b) by 419 days.

This patent is subject to a terminal disclaimer.

(21) Appl. No.: 13/604,402

(22) Filed: Sep. 5, 2012

(65) Prior Publication Data
US 2014/0067819 A1    Mar. 6, 2014

Related U.S. Application Data

(63) Continuation of application No. 12/610,047, filed on Oct. 30, 2009, now Pat. No. 8,266,151.

(51) Int. Cl.
| | | |
|---|---|---|
| G06F 7/00 | (2006.01) | |
| G06F 17/30 | (2006.01) | |
| G06F 16/83 | (2019.01) | |

(52) U.S. Cl.
CPC .................................. G06F 16/83 (2019.01)

(58) Field of Classification Search
CPC ......... G06F 17/30917; G06F 17/30923; G06F 17/30911; G06F 16/83; G06F 16/284; G06F 16/24552; G06F 16/2272
USPC .............. 707/741, 765, 803, 999.1, E17.125
See application file for complete search history.

(56) References Cited

U.S. PATENT DOCUMENTS

| | | | |
|---|---|---|---|
| 5,615,367 A | | 3/1997 | Bennett et al. |
| 5,835,917 A | * | 11/1998 | Shin et al. ..................... 715/209 |
| 6,836,778 B2 | | 12/2004 | Manikutty et al. |
| 6,853,992 B2 | * | 2/2005 | Igata ............................ 707/741 |

(Continued)

FOREIGN PATENT DOCUMENTS

CN         101661481 A      3/2010

OTHER PUBLICATIONS

U.S. Appl. No. 12/690,820, filed Jan. 20, 2010.

(Continued)

*Primary Examiner* — Md I Uddin
(74) *Attorney, Agent, or Firm* — Hickman Palermo Becker Bingham LLP

(57) ABSTRACT

A method and apparatus are provided for building and using a persistent XML tree index for navigating an XML document. The XML tree index is stored separately from the XML document content, and thus is able to optimize performance through the use of fixed-sized index entries. The XML document hierarchy need not be constructed in volatile memory, so creating and using the XML tree index scales even for large documents. To evaluate a path expression including descendent or ancestral syntax, navigation links can be read from persistent storage and used directly to find the nodes specified in the path expression. The use of an abstract navigational interface allows applications to be written that are independent of the storage implementation of the index and the content. Thus, the XML tree index can index documents stored at least in a database, a persistent file system, or as a sequence of in memory.

38 Claims, 8 Drawing Sheets

```
<PurchaseOrder poDate= "July 20, 2009"
    <shipAddr>
        <city>San Mateo</city>
        <zipcode>94402</zipcode>
    </shipAddr>
    <lineItem>
        <name> PC </name>
        <price> $1300 </price>
        <quantity> 1 </quantity>
        <category> computer </category>
    </ lineItem >
    < lineItem >
        <name> printer </name>
        <price> $350 </price>
        <quantity> 2 </quantity>
        <category> peripherals </category>
    </ lineItem >
</PurchaseOrder>
```

(56) References Cited

U.S. PATENT DOCUMENTS

| | | |
|---|---|---|
| 7,162,485 B2 | 1/2007 | Gottlob et al. |
| 7,281,206 B2 | 10/2007 | Schnelle et al. |
| 7,366,735 B2 | 4/2008 | Chandrasekar et al. |
| 7,499,915 B2 | 3/2009 | Chandrasekar et al. |
| 7,680,764 B2 | 3/2010 | Chandrasekar et al. |
| 7,870,124 B2 | 1/2011 | Liu et al. |
| 7,885,980 B2 | 2/2011 | Tarachandani et al. |
| 7,917,515 B1 | 3/2011 | Lemoine |
| 8,024,329 B1 | 9/2011 | Rennison |
| 8,055,683 B2 | 11/2011 | Brodhun et al. |
| 8,090,731 B2 | 1/2012 | Sthanikam et al. |
| 8,266,151 B2 | 9/2012 | Novoselsky et al. |
| 2003/0061189 A1* | 3/2003 | Baskins ............ G06F 17/30961 |
| 2005/0050059 A1* | 3/2005 | Van Der Linden .......................... G06F 17/30917 |
| 2005/0055334 A1* | 3/2005 | Krishnamurthy ................. 707/2 |
| 2005/0228828 A1* | 10/2005 | Chandrasekar et al. ... 707/104.1 |
| 2005/0289175 A1 | 12/2005 | Krishnaprasad et al. |
| 2006/0117307 A1* | 6/2006 | Averbuch ............ G06F 17/2247 717/143 |
| 2006/0167928 A1 | 7/2006 | Chakraborty et al. |
| 2007/0016604 A1 | 1/2007 | Murthy et al. |
| 2007/0174309 A1* | 7/2007 | Pettovello ..................... 707/100 |
| 2007/0299811 A1 | 12/2007 | Chandrasekar et al. |
| 2008/0183657 A1* | 7/2008 | Chang ............... G06F 17/30923 |
| 2008/0215527 A1* | 9/2008 | Charlet et al. .................... 707/1 |
| 2008/0235252 A1* | 9/2008 | Sakai et al. .................. 707/100 |
| 2008/0301129 A1 | 12/2008 | Milward et al. |
| 2009/0182762 A1* | 7/2009 | Chang et al. ................. 707/102 |
| 2009/0265339 A1 | 10/2009 | Chen et al. |
| 2009/0288026 A1* | 11/2009 | Barabas et al. ............... 715/764 |
| 2010/0161569 A1* | 6/2010 | Schreter ............ G06F 17/30327 707/696 |
| 2010/0228781 A1* | 9/2010 | Fowler et al. ................. 707/791 |
| 2011/0093429 A1* | 4/2011 | Ge et al. ......................... 706/54 |
| 2011/0106811 A1 | 5/2011 | Novoselsky et al. |
| 2011/0179085 A1* | 7/2011 | Hammerschmidt .......................... G06F 17/30935 707/797 |
| 2013/0086127 A1* | 4/2013 | Pogmore ............ H04L 9/0869 707/803 |

OTHER PUBLICATIONS

U.S. Appl. No. 12/792,659, filed Jun. 2, 2010, Office Action, dated Feb. 6, 2012.

U.S. Appl. No. 12/792,659, filed Jun. 2, 2010, Office Action, dated Sep. 11, 2012.

U.S. Appl. No. 12/792,659, filed Jun. 2, 2010, Office Action, dated May 16, 2012.

U.S. Appl. No. 12/690,850, filed Jan. 20, 2010, Office Action, dated Jan. 17, 2012.

U.S. Appl. No. 12/690,820, filed Jan. 20, 2010, Notice of Allowance, dated Apr. 11, 2012.

Anguel Novoselsky and Zhen Hua Liu, "XIPE an XML Integrated Processing Encironment", Proceedings of the ICSOFT Conference, dated 2009, 8 pages.

W3C, "Extensible Markup Language (XML) 1.0 (Fifth Edition)" Recommendation dated Nov. 26, 2008, 5 pages.

* cited by examiner

```
<PurchaseOrder poDate= "July 20, 2009"
    <shipAddr>
        <city>San Mateo</city>
        <zipcode>94402</zipcode>
    </shipAddr>
    <lineItem>
        <name> PC </name>
        <price> $1300 </price>
        <quantity> 1 </quantity>
        <category> computer </category>
    </ lineItem >
    < lineItem >
        <name> printer </name>
        <price> $350 </price>
        <quantity> 2 </quantity>
        <category> peripherals </category>
    </ lineItem >
</PurchaseOrder>
```

FIG. 1

```
<a name="bcd">

<b>
        "efg"
    </b>

<c>

<d>
            "hij"
        </d>
    </c>
</a>
```

FIG. 4A

EFFICIENT XML TREE INDEXING STRUCTURE OVER XML CONTENT

CROSS-REFERENCE TO RELATED APPLICATIONS; BENEFIT CLAIM

This application claims benefit under 35 U.S.C. § 120 as a continuation of U.S. application Ser. No. 12/610,047, filed Oct. 30, 2009 now U.S. Pat. No. 8,266,151 issued Sep. 11, 2012, the contents of which is hereby incorporated by reference in their entirety for all purposes, as if set forth herein. The applicant(s) hereby rescind any disclaimer of claim scope in the parent application(s) or the prosecution history thereof and advise the USPTO that the claims in this application may be broader than any claim in the parent application.

FIELD OF THE INVENTION

The present invention relates to efficiently navigating XML documents using a persistent index.

BACKGROUND

XML

Extensible Markup Language (XML) is a World Wide Web Consortium (W3C) standard for representing data. Many applications are designed to output data in the form of XML documents. Various techniques may be used to store data from such XML documents into a relational database.

XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. An element may have one or more children. The resulting hierarchical structure of XML-formatted data is discussed in terms akin to those used to discuss a family tree. For example, a sub-element is said to descend from its parent element or any element from which its parent descended. A parent element is said to be an ancestor element of any sub-element of itself or of one of its descendant element. Collectively, an element along with its attributes and descendants, are referred to as a tree or a sub-tree.

XML data may be stored in relational databases using object relational storage or binary XML BLOB storage or CLOB storage because such databases are very efficient at manipulating data. However, while it may be efficient to search object relational storage or binary XML storage down the XML hierarchy from parent to child, these storage structures are not well suited for performing hierarchical navigation that requires traversing ancestor links up the hierarchy or sibling traversal.

Storage and Querying Systems for XML

Various types of storage mechanisms are used to store an XML document. One type of storage mechanism stores an XML document as a text file in a file system. Another type of mechanism for storing XML documents is a database server. XML documents may be stored in a relational database by shredding the document into individual elements and storing the elements in individual columns of a table. In a database server, an XML document may be stored in a row of a table, and nodes of the XML document may be stored in separate columns in the row.

Alternatively, an entire XML document may be stored as a large object (LOB) in a column of a database table. This alternative is useful when no schema exists and/or the structure of an XML document is not known. The large object column may store a character large object (CLOB) stored as text or instead may be stored as a binary large object (BLOB). The binary object may comprise a tokenized stream of XML data. Such a tokenized stream for an XML document may alternatively be stored in volatile memory.

XML Query and XPath

It is important for database systems that store XML data to be able to execute queries using XML query languages. XML Query Language (XQuery) and XML Path Language (XPath) are important standards for a query language, which can be used in conjunction with SQL to express a large variety of useful queries. XPath is described in XML Path Language (XPath), version 1.0 (W3C Recommendation 16 Nov. 1999), herein incorporated by reference, as well as in XML Path Language (XPath) 2.0 (W3C Recommendation 23 Jan. 2007), herein incorporated by reference . XQuery is described in XQuery 1.0: An XML Query Language (W3C Recommendation 23Jan. 2007), herein incorporated by reference. Also, there is an XQuery scripting language.

Path Expressions

The structure of an XML document establishes parent-child relationships between the nodes within the XML document. The "path" for a node in an XML document reflects the series of parent-child links, starting from a "root" node, to arrive at the particular node. For example, the path to the "price" node in the example XML document 100 shown in FIG. 1 is /PurchaseOrder/lineItem/price, since the "price" node is a child of the "lineItem" node, and the "lineItem" node is a child of the "PurchaseOrder" node.

A path expression is evaluated relative to a particular node called the "context" which is the starting point for the navigation. Navigation is specified using the path axes (".", "/", "//", and ".."). Each of these axes selects one or more nodes which are then further filtered based on what name test or node test followed the axis.

The current context axis "." selects the current context node. The child axis (/) selects the list of children nodes of the context, while the descendant axis (//) selects the list of all descendents of the context node. In effect, // can be considered a substitute for one or more levels of hierarchy. The parent axis (..) selects the immediate parent of the context node. The name test or node test is used for further filtering of the set of nodes following the axis. Only the nodes which pass the name or node test are added to the results of the path evaluation. A wildcard character ("*") matches all element nodes. The axis may change the navigation direction as each path step is performed.

By stringing path axes and name/node tests together, users can traverse the document tree. If the result from evaluating the previous XPath step includes more than one node, then the next XPath step is evaluated once for each node in the result set, using one result set node at a time as context node.

A subset of XPath axis and name/node tests includes:

| | |
|---|---|
| / | Child axis |
| // | Descendant axis |
| . | Current axis |
| .. | Parent axis |
| * | Wildcard name test |

The syntax used herein is standard XPath syntax. However, it should be appreciated that embodiments include using any syntax having equivalent semantics as the above axes.

Here are some examples of evaluating path expressions on the example XML Document 100.

./shipAddr/city finds all city elements within a shipAddr element. The children nodes of the current context are found whose name is "shipAddr". The children of those "shipAddr" elements whose name is "city" are found next. Thus, if the context is the "/PurchaseOrder" node, the result of evaluating the path expression is {PurchaseOrder/shipAddr/city }

PurchaseOrder//category/* finds all category elements one or more levels deep in the PurchaseOrder hierarchy (arbitrary descendants). For example, in the context of the root node, the results would be {/PurchaseOrder/lineItem/category/computer, /PurchaseOrder/lineItem/category/peripherals}.

PurchaseOrder/*/category/* finds all category elements that are grandchildren (i.e. there is exactly one level between PurchaseOrder and category) of PurchaseOrder elements, unlike in the previous example in which any number of hierarchical levels may intervene. However, in this particular example, the results are the same.

./..

finds the parent element of the current context. If the current context is "/PurchaseOrder/shipAddr/zipcode", then evaluating "./.." results in {/PurchaseOrder/shipAddr" }.

Descending in the tree from parent to child is called forward navigation. Ascending up the hierarchy from child to parent is referred to as backward navigation. Paths that start with slash ("/") are evaluated starting at the root node of the hierarchy. Thus, to efficiently support all possible XPath queries, performing backward navigation, sibling navigation, and finding the root of the hierarchy must be fast.

Navigating XML Data

When the XML data is stored as a SAX stream token sequence, such as binary XML, in order to navigate forward, the tokens have to be read sequentially until the desired node is found. There is no random access within the document for navigating directly to a child node without reading and skipping all the previous descendants. Finding a parent or ancestor node requires processing the sequence from the beginning of the sequence because parents and ancestors appear before the current node in the sequence. Finding a sibling node depends on whether the sibling appears before or after the current node in sequence. Although ancestors and siblings may be identified by following forward links in this way, multiple passes through the document may be required.

The XPath/XQuery languages support the operations that can be performed on a tree. However, storing XML data as described above and indexing the data does not provide for efficient navigation of tree-traversal. To overcome this problem, an in-memory document object model (DOM) may be created, and the navigation operations may be performed on the DOM. One problem with this approach is that the entire DOM tree must be constructed in memory before the tree traversal can be performed, even if only a few nodes out of the entire tree are needed to evaluate an expression. For a large document, this presents a scalability issue both in terms of time to build the tree and the amount of memory required to process an XPath expression. Building an in-memory DOM may require ten times as much space as the size of the XML document that the DOM represents. Thus, a 100 MB document may require a gigabyte of memory to hold the DOM tree.

To avoid the above-mentioned problems with constructing a DOM in volatile memory, another approach is to store the navigation links of the hierarchy persistently together with the XML content. In other words, the XML data may be stored as a tree on disc, with each node of the hierarchy storing both content and navigation links. Each node of the hierarchy may contain links providing random access to other nodes in the hierarchy. However, such an approach may require that the navigation links that support accessing ancestors, siblings, and children be stored interleaved with the content of each node.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an example XML document.

FIG. 4A is an example XML document.

DETAILED DESCRIPTION

Figure 2:
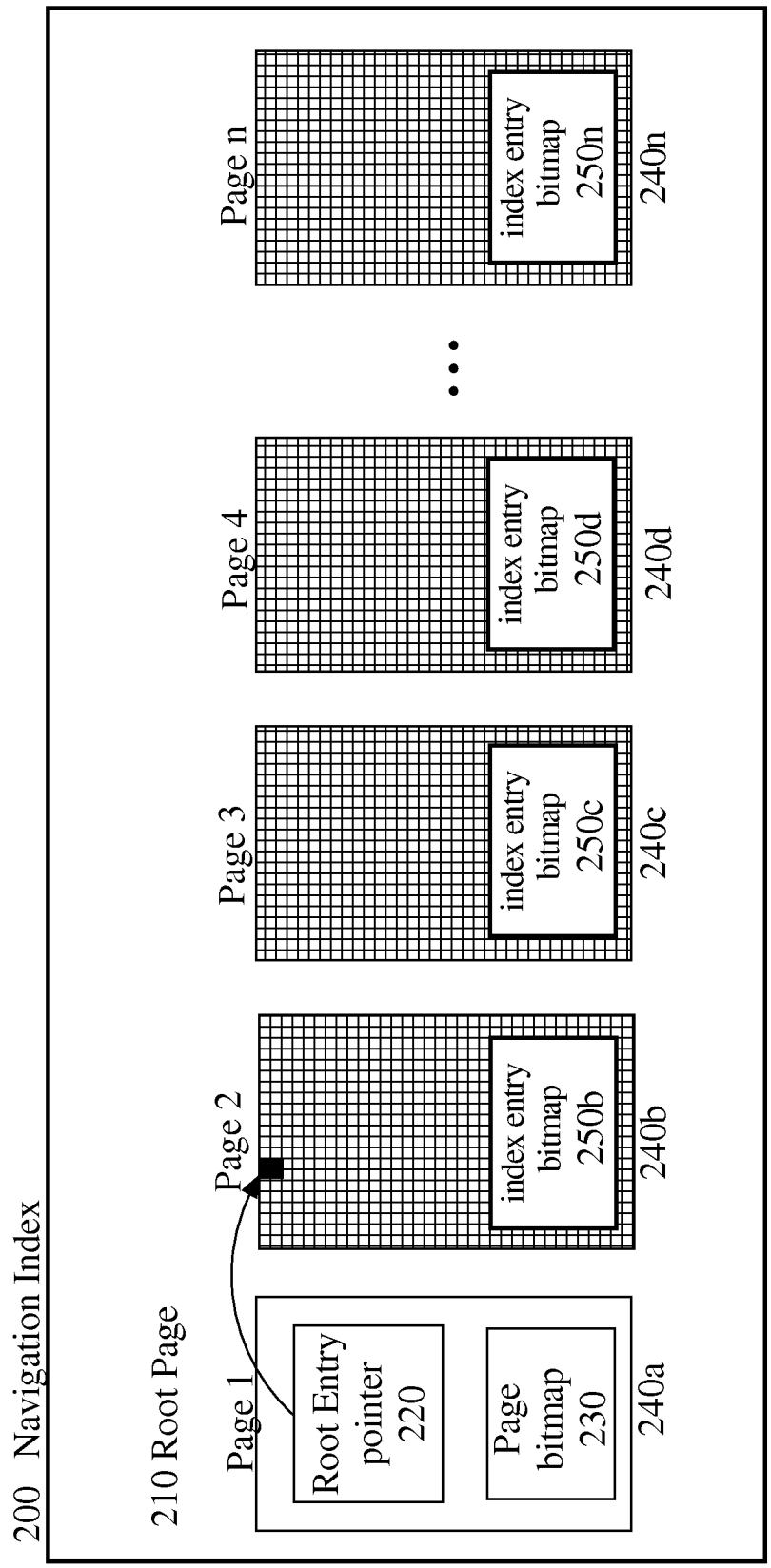
FIG. 2 is a diagram of the XML tree index according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for building and using a persistent XML tree index for navigating the nodes of an XML document, referred to interchangeably herein as the "navigation index", "XML tree index", or simply "index." The XML tree index is stored separately from the XML document content, and thus is able to optimize performance through the use of fixed-sized index entries. The XML document hierarchy need not be constructed in volatile memory, so creating and using the XML tree index scales even for large documents. To evaluate a path expression including descendent or ancestral syntax, navigation links can be read from persistent storage and used directly to find the elements specified in the path expression. The use of an abstract navigational interface allows applications to be written that are independent of the storage implementation of the index and the content. Thus, the XML tree index can index documents stored in one of several different ways including in a database, a persistent file system, or as a sequence in memory.

The techniques described herein present improvements over approaches described earlier. Whereas relational constructs such as SQL joins and path indexing can handle forward navigation, relational databases may not be efficient at traversing ancestral or sibling relationships of data in a hierarchy. However, languages such as XPath and XQuery provide direct support for such backward navigation. Thus, relying on an XML tree index as an overlay to the XML data stored in a relational database may be more efficient than attempting to perform such navigation using pure relational constructs.

For example, a persistent XML tree index may be created that allows direct navigation to the root of the hierarchy, a parent, ancestor, sibling or child. There is no need to construct a DOM tree in memory before traversing links to perform a navigation operation because the index hierarchy may be saved persistently in non-volatile storage.

Rather than adopting a storage model that keeps navigation links together with the XML content in a node of a DOM tree, the approach described herein stores the content of an XML document separate from navigation links. An index that facilitates navigation can be created only as needed or desired. The XML tree index is comprised of fixed-sized index entries. The term "fixed sized" is used herein to indicate that every index entry has the same size as every other, and for a particular embodiment, the size does not change during normal operation. Thus the size of an index entry does not depend on the size of the XML document or the size of the corresponding XML document node. Fixed-sized entries may allow for the use of very fast array arithmetic in directly accessing a particular index entry.

An abstract interface provides navigation operations that are storage independent. Thus, the XML tree index can be built and used over XML data stored in any storage model.

Structure of the Navigation Index

Each XML document may have its own separate XML tree index. An index may be generated and stored in response to a request to index a particular XML document. One index entry corresponds to exactly one node of the corresponding XML document. There are both navigation links and links to content stored in each index entry. Navigation links point to other index entries for traversing the XML hierarchy, and content links point into the XML content storage. All the individual elements of an index entry have the same size as the elements in each other index entry, and thus all index entries may be of the same size. An embodiment using fixed-sized index entries is more efficient than variable sized. Maintaining a list of free index entries can be performed using a simple bitmap, and the bitmap can be used together with fast array arithmetic to identify the address of an index entry to allocate or free.

Referring to FIG. 2, the XML tree index 200 is comprised of a set of contiguous, fixed-sized virtual memory pages [240a-240n]. The Root Page 210, shown as the first page 240a contains the Root Entry Pointer 220 which is a link to the index entry representing the root node of the document. Having a link to the root entry in a known location allows the root node index information to be stored in different index entries over time. The root page of the index may also contain a bitmap of the free index pages 230. In addition to containing index entries, every index page contains an index entry bitmap [250b-250n] for tracking the free and used index entries within the page. When a node is removed from the document, the space taken by the index entry corresponding to the deleted node may be made available for reuse simply by clearing the bit corresponding to the index entry in its page's index entry bitmap. Similarly, when a free index entry is selected to be used to correspond to a new node added to the document, the corresponding bit in the bitmap is set to indicate that the index entry is in use, and the new index entry information can overwrite the information stored for previous use in that entry.

Structure of an Index Entry

Figure 3:
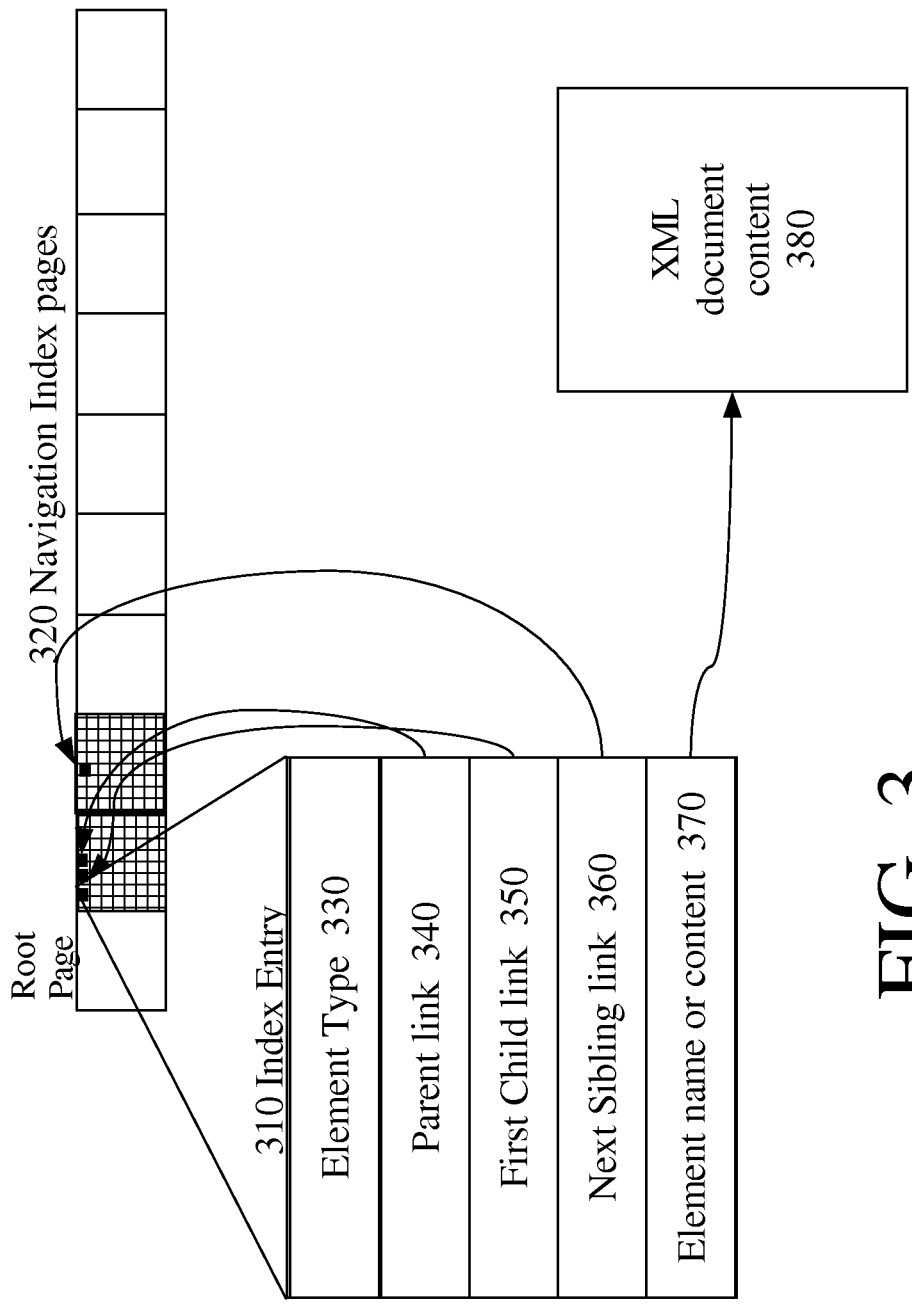
FIG. 3 is a diagram of an XML tree index entry node according to one embodiment of the invention.

Referring to FIG. 3, as described above, each page of the Navigation Index 320 is divided into a set of fixed-sized index entries. An Index Entry 310 is comprised of the following information: element type, parent link, first child link, next sibling link, and a link into the XML content that either contains the element name or the element value if the element is a leaf node. Element Type 330 indicates the type of node that corresponds to the index entry and may be, for example, an element, attribute, text, comment, or processing instruction code. The arrows from the Parent Link 340, First Child Link 350, and Next Sibling Link 360 all point to other index entries within the XML tree index. The other index entries may reside in the same page or a different page as the index entry containing the links. Element name or content link 370 points to a location within the XML content itself. The XML content may contain variable-sized data.

The embodiment shown in FIG. 3 is a minimal set of links for supporting DOM navigation. However, additional links may be used for further performance enhancements including but not limited to having separate child element and attribute links, and a previous sibling link. That is, instead of linking elements and attributes together as siblings, there can be a list of attributes and a list of children elements, and a pointer to each list may be stored in the index entry. In addition, an index entry may include a flag to indicate that the index entry corresponds to a first child node or a last child node.

The size of each index entry may be selected to optimize the performance of accessing the data contained within each index entry. In one embodiment, the size of an index entry is selected so that each entry lies on an address boundary that is a power of two. Fast array arithmetic, for example using bit shifting operator instead of multiplication, may be used for determining the location of a desired index entry. The location of an index entry may be expressed as a (Page number, offset number) tuple, where the offset number may also be referred to as the index entry number.

Separating Index from Content

An embodiment in which navigation of XML document nodes is supported through an index stored separately from the corresponding document has many benefits over a system in which storage management maintains navigation links are interleaved within the XML content nodes. The XML tree index described herein may be created only for those documents for which full navigation is needed. Navigation links need not be generated, stored, and maintained if the use model of the document does not require navigation. The ability to selectively index documents is a benefit over a system in which indexing is handled by the storage system. For example, if the storage scheme is to store a persistent DOM, all documents may be stored with navigation links embedded within the XML document content. However, applications using an XML document in a collection of documents might not require backward navigation, and thus the time to create and maintain the navigation links, as well as the space to store the links, may be wasted.

An embodiment that stores index entries contiguously with each other provides better locality of reference. Storing navigation links interspersed within the content of a very large XML document raises the probability that traversing a navigation reference will cross a virtual memory page boundary, and incur the cost of a page fault. Creating an index of small, contiguous, fixed-sized index entries that share a common virtual memory page raises the probability that traversing a navigation link will result in referencing an index entry at an address within the same virtual memory page that is already in memory. In addition, by maintaining the minimal size of the content (i.e., by not interspersing additional links) the content requires fewer virtual memory pages than is needed for an integrated approach. Thus, separating navigation links from content raises the locality of reference for both navigation and content accesses.

Another benefit of separating the navigation links from the content is that certain kinds of changes to the content need only affect the location of the content links, and not the navigation links. For example, when a node is inserted into the hierarchy or the size of an element name or text value is changed, the offsets for nodes in the content may change. When the location of a node changes, links to those nodes must be updated to reflect the change. Thus, when all links are stored within variable sized data, all links (both navigation and content) must be updated. When the location of a content node changes, the location of its corresponding index entry does not need to change. Only the content links to the re-located node, and not the navigation links to the corresponding index entry, need to be updated. Thus, updates to the content require less maintenance on the index.

Yet another benefit of an embodiment using a separate index is that the index may be created on a set of XML documents without changing what is stored in the document itself. There is no need to insert navigational links that were not there prior to constructing the index.

Example Index Entry for a Document

Figure 4A:
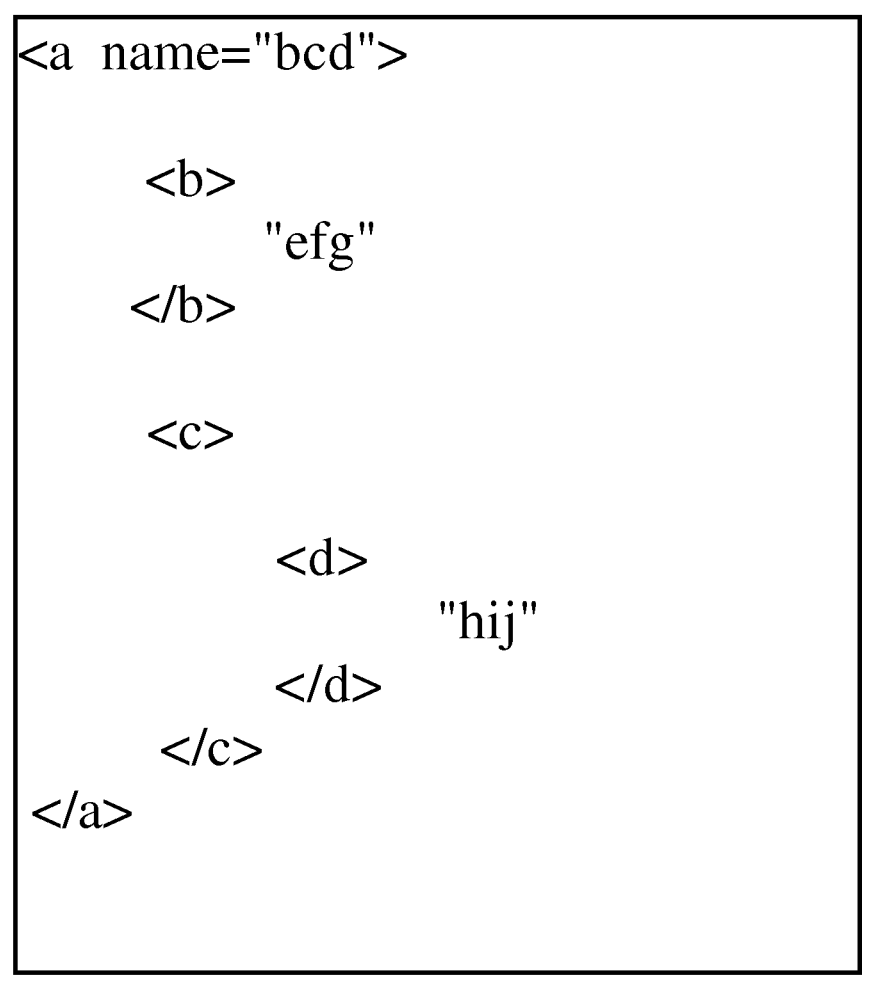
Figure 4B:
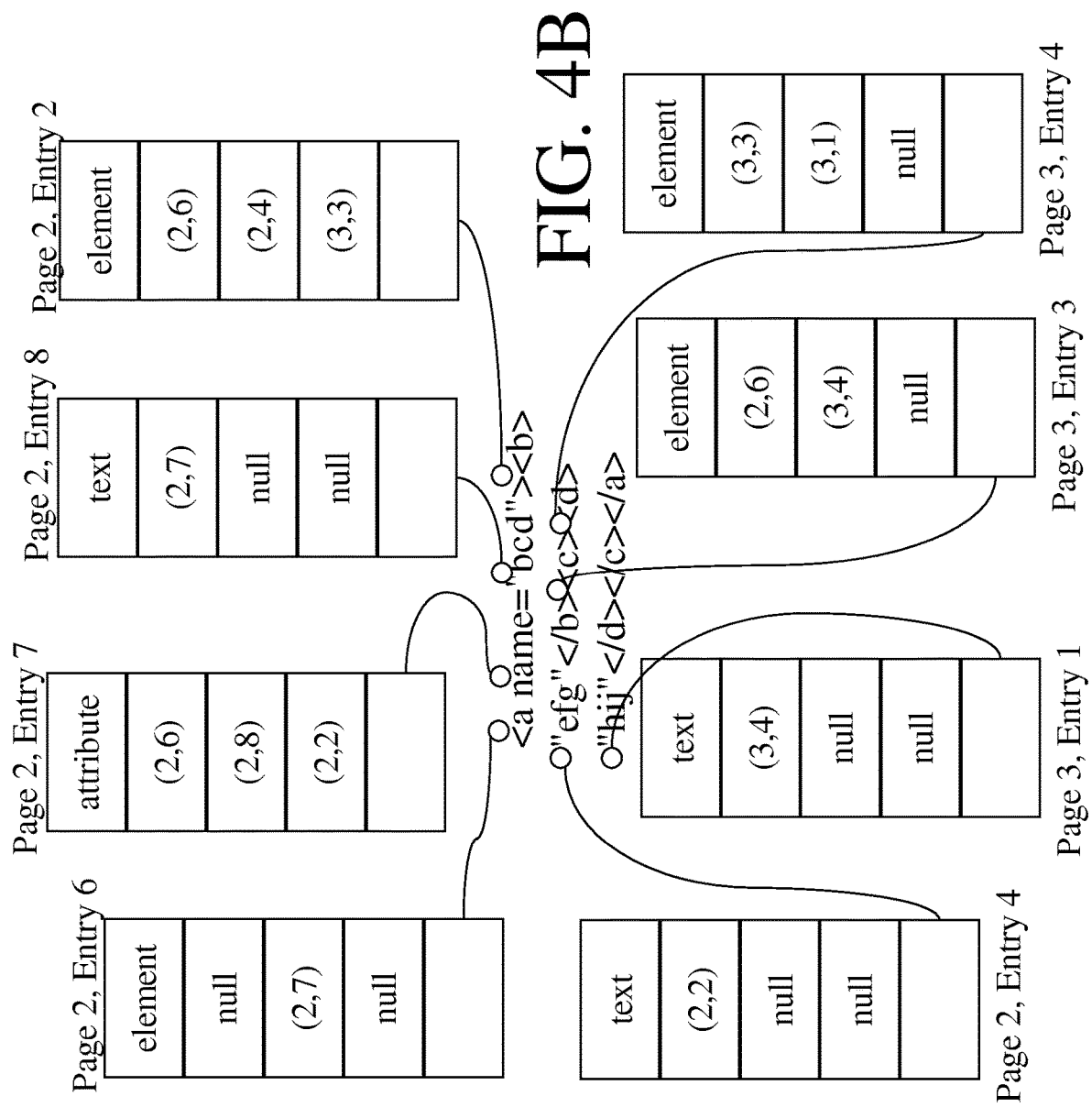
FIG. 4B is a diagram of example index entries for the example document in FIG. 4A according to an embodiment of the invention.

FIG. 4A shows a simple XML document that is used in FIG. 4B to provide an example set of index entries representing an XML tree index on the example XML document shown in FIG. 4A. Each index entry is labeled with the page number and index entry number. The index entry number may be an offset of the entry from the beginning of the page. The links may be indicated by a (page number, entry number). Thus (1,1) may be a link that references the first entry of the first page of the XML tree index. In the example, the index entry corresponding to XML element "a" resides at (Page 2, Entry 6). Element "a" is the root entry of the document. As such, there are no parent or sibling links. In an embodiment where child and attribute links are treated as siblings (i.e., there is only one link to both children and attributes), the first child link corresponds to (Page 2, Entry 7) which represents the attribute "name." In an embodiment where there are separate links for first child and first attribute, the first attribute link corresponds to (Page 2, Entry 7). The content link for the root of the document points to a location within the content where the element name "a" is stored.

The index entry for the attribute "name" has a parent link back to the entry representing element "a". The index entry points to a child entry represented by (Page 2, Entry 8). The sibling link points to the entry representing element "b" located at (Page 2, Entry 2), because element 2 is the next child of element "a" that follows the attribute "name." The content link for the attribute points to a location in the content where the attribute name "name" is stored.

(Page 2, Entry 8) represents an XML leaf node containing the content of the attribute. The content link points to a location in the content where the value "bcd" is stored. The attribute value has a parent link to the attribute name but contains no child or sibling links.

There are many possible embodiments for how the content links are represented. In one embodiment, where the XML is a sequence of bytes, the content link may be a byte offset from the beginning of the document. In another embodiment, the strings may be parsed out of the XML document and placed in a table, with the content link referencing the symbol table entry corresponding to the string content. Different embodiments may be storage dependent. For example, if XML content is stored as binary XML, the link to the content may be a token identifier that can be used to retrieve the content from the token table.

Navigating XML Data Using the Index

Figure 5:
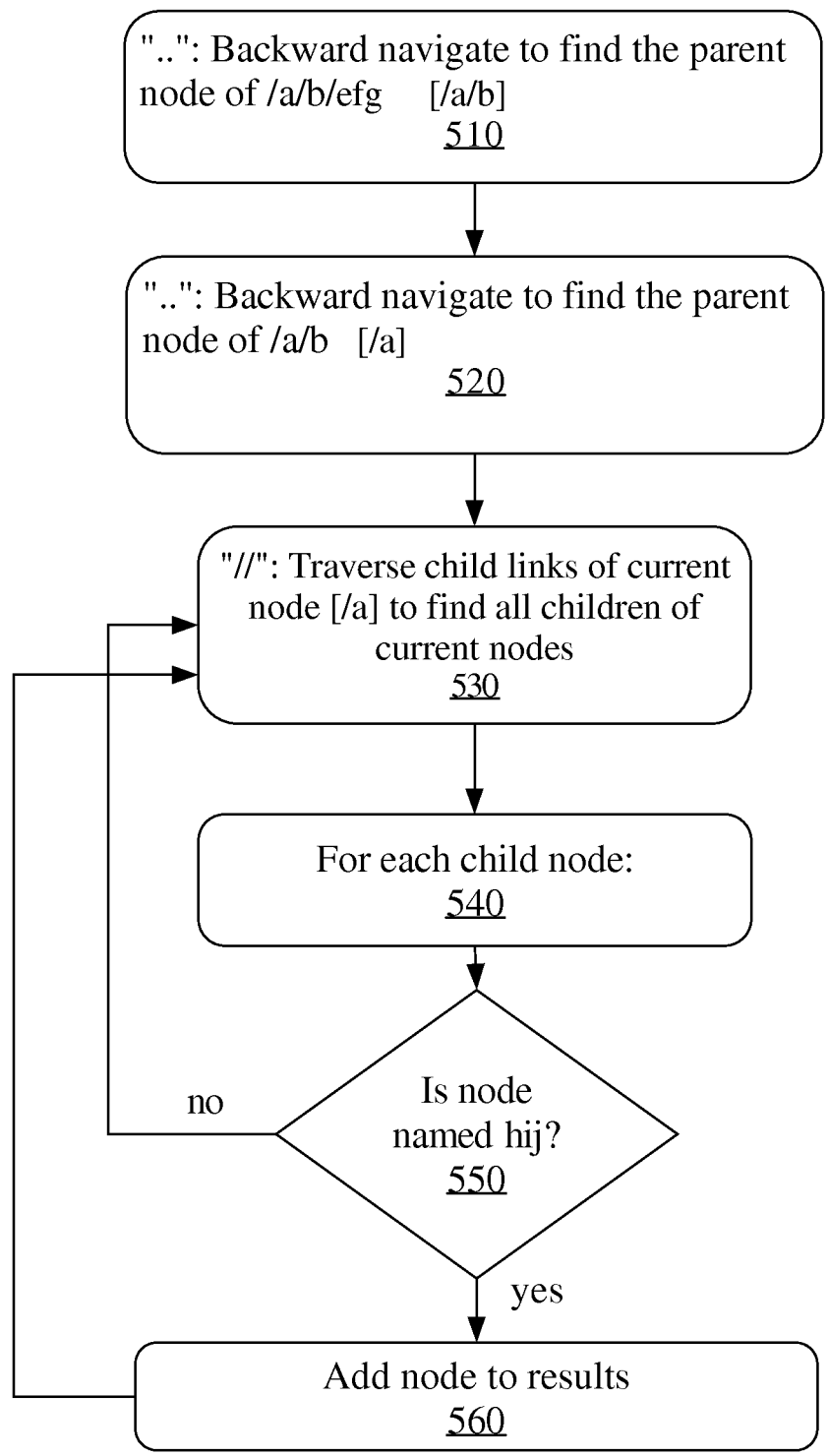
FIG. 5 is a flow chart explaining how to perform an example navigation using the XML tree index according to an embodiment of the invention.

An XPath expression containing navigation in all axes may be evaluated using the index. For purposes of explanation, the phrase "index entry context" is used to mean "the index entry corresponding to the context node." Likewise, the "the first child index entry" is equivalent to "the index entry corresponding to the first child node", etc. FIG. 5 is a flow diagram showing navigation within an XML document as specified in a particular path expression for one embodiment of the invention. For example, assume '/a/b/efg' finds only one element node whose name is 'efg' (as shown in FIG. 4A). Starting from the index entry context (2,4) which corresponds to the element node whose name is 'efg', the path expression "../..//hij" is evaluated as follows. In Step 510, evaluating ".." causes the parent link in the index entry context to find the index entry corresponding to the parent node of the current context (2,2). In Step 520, evaluating ".." again causes the parent link in (2,2) to find the index entry (2,6).

Index entry (2,6) then becomes the current index entry context. The content within this parent node need not be examined in this example because the axis "//" is evaluated next. "//hij" is evaluated by searching all descendents of the context node looking for a descendent element node with the name "hij". "//" indicates that all descendent nodes will be examined. In Step 530, the child link of the index entry context finds the first child index entry of the context. The other children of the index entry context are found by traversing the sibling links of the first child index entry. In this example the index entries that are the children of (2,6) are (2,7), (2,2), and (3,3). These index entries form the result set associated with Step 530. In Step 540, for each index entry in the result set, the content pointer is used to locate the name of the corresponding node and compare the name of the node against 'hij'. None of the nodes in this result set have the name 'hij', and therefore, Step 560 is not performed. Next, each of the index entries in the result set is evaluated in turn as the current context. The flow continues recursively until all descendents from index entry (2,6) have been evaluated. For those index entries corresponding to nodes having the name 'hij', Step 560 is performed to add the index entry to the final result set.

It should be appreciated that there are many alternate embodiments for traversing the hierarchy, including but not limited to collecting all descendent nodes first, then performing the name test on their content, performing a depth first search (all first children, then siblings) rather than a breadth first search, or processing the nodes iteratively rather than recursively.

As another example, evaluating the path "/a/c/hij" with leading/in the xpath indicates starting at the root of the tree, that is, the first step is to find the root index entry node. The location of the root index entry is found at a fixed location on the root page of the XML tree index. The location is read from the fixed location, and the link is traversed to visit the root node. The root node becomes the current context to evaluate the rest of the XPath expression.

The XML tree index may also be used in conjunction with various other kinds of XML indexes that can index nodes of an XML document stored in a database. For example, a path index can find nodes given an XPath, and a value index can find nodes given the value to be searched for. Each of these XML indexes can store the persistent XML tree index entry addresses instead of storing the XML content addresses so that navigation can be efficiently performed from the results of index search. For example, to answer xquery 'for $g in /a/b/c return $g/../d', a path index can be used to find XML tree index entries corresponding to XML document nodes that that satisfy the xpath 'a/b/c'. Since the found "nodes" from the path index are actually XML tree index entries, it is efficient to use the found XML tree index entries as the context nodes for evaluate the xpath '$g/../d'.

Virtual Memory Management for Tree Index Pages

Operating system virtual memory management has to support many applications, and thus is not optimized for any particular application. Instead of relying on the general policies used by such operating system support for virtual memory management, the XML tree index may be maintained more efficiently by relying on a custom paging algorithm and framework that controls the working set pool size of the memory needed for the XML tree index. In one embodiment, the framework uses a pageable architecture, and may maintain the least and most recently-used index pages to decide paging policy.

When an index can be compressed, then there is less I/O to read from and write onto the disk, which speeds up performance. Semantic-aware compression may be performed on the index entries of the XML tree index instead of using a classical run-length encoding compression algorithm. The semantic-aware compression understands different parts of the XML tree index page and may significantly compress the size of an index page. In one embodiment, the size of a compressed page may be half the size of an uncompressed index page.

Figure 6:
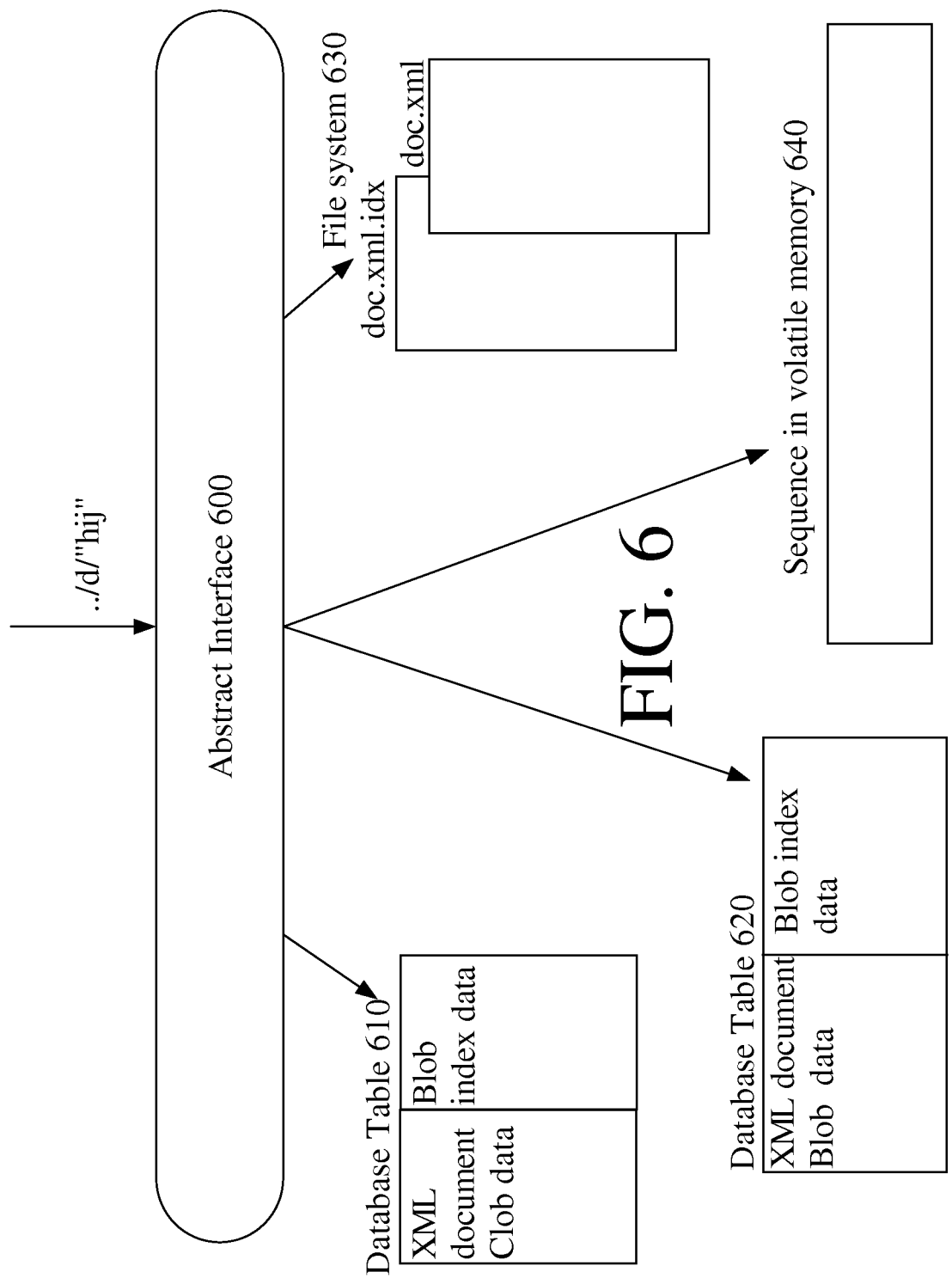
FIG. 6 is a diagram showing storage format independence according to an embodiment of the invention.

XML Content Interface to Achieve XML Content Storage Independence for XML Tree Index FIG. 6 is a diagram showing an abstract interface that hides the implementation details of how the underlying XML content data is stored. An application program, including XPath or XQuery processor, that uses a DOM interface may use the XML Tree index to navigate XML data without knowing how the XML content data is stored. The XML content storage-dependent implementation is encapsulated in objects that implement the abstract XML content interface. The XML Tree Index navigation operation may be implemented based on the XML content interface over the underlying storage of the XML data. As a result, the XML data may be stored in one of many ways including in a database as a CLOB, as a BLOB, as a file in a file system, or as a sequence of tokens in volatile memory. The XML content interface provides how to fetch the data content given the content link that is stored in the XML tree index node entry.

The storage of the index may also depend on the storage of the XML data. For example, if the XML document is stored as a CLOB in Database Table 610 or a BLOB in Database Table 620, the corresponding index may be stored in the document row in a BLOB column of the same row. If the content is stored as character data in a file of a file system, the index may be stored in a separate file system file that references content with a byte offset from the beginning of the file. XML content stored as a sequence of tokens in volatile memory may be indexed using links to the offset of a token within the sequence. The index may also be stored in volatile memory or in some other persistent storage mechanism.

XML Tree Index to DOM Conversion at Runtime

Small XML documents can gain the benefits of persistent index storage without sacrificing efficiency at runtime. An application processing a small XML document can convert the XML tree index for the document into an in-memory DOM that supports the DOM API. Since in-memory DOM traversal is typically faster than traversing XML tree index directly, for small size XML document, it may still be advantageous to store the index persistently, then convert the index into an in-memory DOM object.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
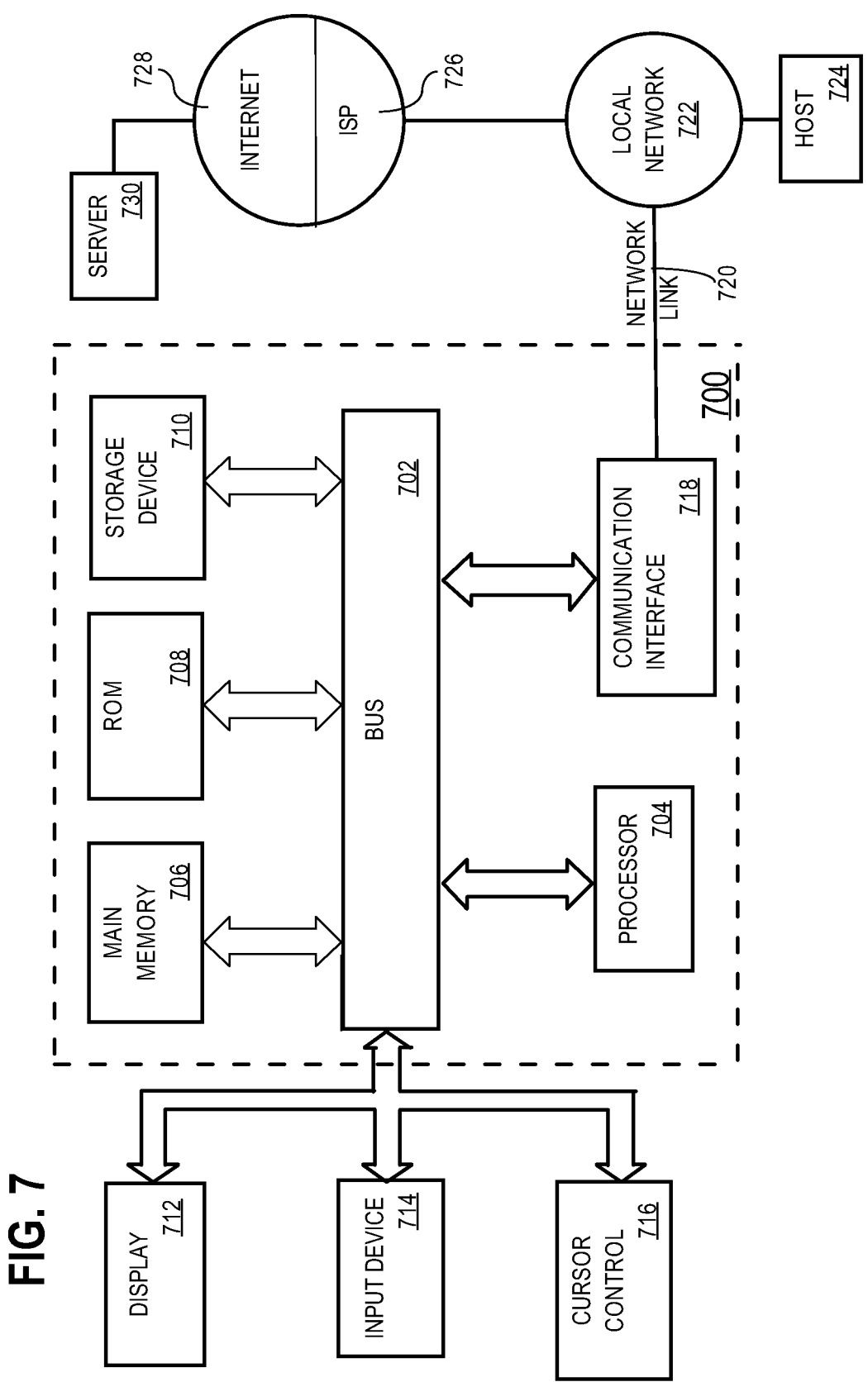
FIG. 7 is a diagram of a computer system on which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
storing an XML document in a database of a database system;
generating an XML tree index on said XML document, wherein the XML tree index comprises a plurality of index entries, each index entry of the plurality of index entries having a one-to-one correspondence with a node of said XML document;
storing the entire plurality of index entries in a single row of a table in said database, comprising at least one of:
storing the entire plurality of index entries in a relational table, and
storing at least one node of said XML document in at least one of: said single row, and a column of a table;
wherein the method is performed by one or more computing devices.

2. The method of claim 1, wherein
a first index entry of the plurality of index entries corresponds to a particular node of said XML document; and
said first index entry comprises at least:
a) a first link to a second index entry in said XML tree index, wherein the second index entry corresponds to a parent node of the particular node of said XML document;
b) a second link to a third index entry in said XML tree index, wherein the third index entry corresponds to a first child node of the particular node of said XML document; and
c) a third link to a fourth index entry in said XML tree index, wherein the fourth index entry corresponds to a next sibling node of the particular node of said XML document.

3. The method of claim 2, wherein the first index entry further comprises:
d) a fourth link to a fifth index entry in said XML tree index, wherein the fifth index entry corresponds to a previous sibling node of the particular node of said XML document; or
e) a fifth link to a sixth index entry in said XML tree index, wherein the sixth index entry corresponds to an attribute node of the particular node of said XML document.

4. The method of claim 2, wherein said first index entry further comprises:
a node type of the particular node and a content link into XML document content;
wherein the node type is one of:
a) an element node
b) a text node
c) a comment node
e) a processing instruction node
f) an attribute node; and
wherein the content link into said XML document content points to a location within the XML document content that contains one of:
a) an element name of an element node;
b) an attribute name of attribute node;
c) a text value of a text node;
d) comment content of a comment node; or
e) processing instruction content of a processing instruction node.

5. The method of claim 2, further comprising:
receiving a path-based expression requiring navigation of a node hierarchy within said XML document and a starting index entry;
retrieving at least one link from the first link, the second link, the third link, in the starting index entry, and traversing said at least one link to navigate a corresponding hierarchy of index entries; and
determining a final index entry that corresponds to an XML document node represented by the path-based expression.

6. The method of claim 5, wherein said traversing said at least one link includes calling a function through an abstract XML content interface to obtain content of an XML node identified by the path-based expression, wherein implementation of the function depends on underlying storage of XML content that is being navigated by the path-based expression.

7. The method of claim 5, further comprising:
accessing a fixed location within the XML tree index to find a link to a root index entry; and
using the link to the root index entry to access an index entry corresponding to a root node of the node hierarchy.

8. The method of claim 1, further comprising,
in response to receiving a certain XML document, building the XML tree index for said certain XML document without changing content of said certain XML document.

9. The method of claim 1, wherein each XML document is stored as one of:
a) a character large object (CLOB) stored in a database table;
b) binary XML stored in the database table;
c) an XML file stored persistently in a file system of a non-volatile storage device;
d) the XML file stored in volatile memory; or
e) a sequence of XML tokens stored in volatile memory.

10. The method of claim 1, wherein the XML tree index for said XML document is stored as one of:
a) a binary large object (BLOB) column in a database table;
b) a file in a file system that references positions of elements found within a file of XML content; or
c) an array stored in volatile memory pointing to memory addresses in a sequence of XML tokens comprising XML content.

11. The method of claim 1, wherein size of said each index entry is $2^m$ bytes of space, wherein m is a positive integer.

12. The method of claim 11 wherein the size of said each index entry is one of 32 bytes or 64 bytes.

13. The method of claim 1, wherein generating said XML tree index is performed in response to a request to generate said XML tree index on said XML document.

14. The method of claim 1, further comprising creating a path table index over nodes of said XML document; and
storing, in said path table index, one or more path table index entries, each path table index entry comprising an XML tree index entry address corresponding to each node of the nodes of said XML document.

15. The method of claim 1, wherein the XML tree index on said XML document is converted into an in-memory DOM object.

16. The method of claim 1, further comprising storing said XML tree index persistently in said database, wherein storing the XML tree index persistently in said database further comprises using semantic-aware compression to compress the XML tree index based on knowledge of a structure of said each index entry.

17. The method of claim 1, wherein said XML tree index is comprised of a set of index pages;
    wherein an XML tree index page of said set of index pages is comprised of one or more index entries;
    wherein an index page has a one-to-one correspondence to a virtual memory page that is managed by an operating system; and
    the method further comprising controlling a working set size of virtual memory pages, wherein said virtual memory page contains one or more index pages.

18. The method of claim 17, further comprising:
    receiving a request to add a new node to an existing XML document;
    retrieving a bitmap located on a page in the XML tree index for said existing XML document;
    using the bitmap to find a location within the page of an empty index entry; and inserting a new index entry into said location that corresponds to the new node.

19. One or more computer-readable non-transitory storage media storing instructions which, when executed by one or more processors, cause:
    storing an XML document in a database of a database system;
    generating an XML tree index on said XML document, wherein the XML tree index comprises a plurality of index entries, each index entry of the plurality of index entries having a one-to-one correspondence with a node of said XML document;
    storing the entire plurality of index entries in a single row of a table in said database, comprising at least one of:
        storing the entire plurality of index entries in a relational table, and
        storing at least one node of said XML document in at least one of: said single row, and a column of a table.

20. The one or more computer-readable non-transitory storage media of claim 19, wherein
    a first index entry of the plurality of index entries corresponds to a particular node of said XML document; and
    said first index entry comprises at least:
    a) a first link to a second index entry in said XML tree index, wherein the second index entry corresponds to a parent node of the particular node of said XML document;
    b) a second link to a third index entry in said XML tree index, wherein the third index entry corresponds to a first child node of the particular node of said XML document; and
    c) a third link to a fourth index entry in said XML tree index, wherein the fourth index entry corresponds to a next sibling node of the particular node of said XML document.

21. The one or more computer-readable non-transitory storage media of claim 20, wherein the first index entry further comprises:
    d) a fourth link to a fifth index entry in said XML tree index, wherein the fifth index entry corresponds to a previous sibling node of the particular node of said XML document; or
    e) a fifth link to a sixth index entry in said XML tree index, wherein the sixth index entry corresponds to an attribute node of the particular node of said XML document.

22. The one or more computer-readable non-transitory storage media of claim 20, wherein said first index entry further comprises:
    a node type of the particular node and a content link into XML document content;
    wherein the node type is one of:
        a) an element node
        b) a text node
        c) a comment node
        e) a processing instruction node
        f) an attribute node; and
    wherein the content link into said XML document content points to a location within the XML document content that contains one of:
        a) an element name of an element node;
        b) an attribute name of attribute node;
        c) a text value of a text node;
        d) comment content of a comment node; or
        e) processing instruction content of a processing instruction node.

23. The one or more computer-readable non-transitory storage media of claim 20, wherein the instructions further cause:
    receiving a path-based expression requiring navigation of a node hierarchy within said XML document and a starting index entry;
    retrieving at least one link from the first link, the second link, the third link, in the starting index entry, and traversing said at least one link to navigate a corresponding hierarchy of index entries; and
    determining a final index entry that corresponds to an XML document node represented by the path-based expression.

24. The one or more computer-readable non-transitory storage media of claim 23, wherein said traversing said at least one link includes calling a function through an abstract XML content interface to obtain content of an XML node identified by the path-based expression, wherein implementation of the function depends on underlying storage of XML content that is being navigated by the path-based expression.

25. The one or more computer-readable non-transitory storage media of claim 23, wherein the instructions further cause:
    accessing a fixed location within the XML tree index to find a link to a root index entry; and
    using the link to the root index entry to access an index entry corresponding to a root node of the node hierarchy.

26. The one or more computer-readable non-transitory storage media of claim 19, wherein the instructions further cause:
    in response to receiving a certain XML document, building the XML tree index for said certain XML document without changing content of said certain XML document.

27. The one or more computer-readable non-transitory storage media of claim 19, wherein each XML document is stored as one of:
    a) a character large object (CLOB) stored in a database table;
    b) binary XML stored in the database table;
    c) an XML file stored persistently in a file system of a non-volatile storage device;
    d) the XML file stored in volatile memory; or
    e) a sequence of XML tokens stored in volatile memory.

28. The one or more computer-readable non-transitory storage media of claim 19, wherein the XML tree index for said XML document is stored as one of:
   a) a binary large object (BLOB) column in a database table;
   b) a file in a file system that references positions of elements found within a file of XML content; or
   c) an array stored in volatile memory pointing to memory addresses in a sequence of XML tokens comprising XML content.

29. The one or more computer-readable non-transitory storage media of claim 19, wherein size of said each index entry is $2^m$ bytes of space, wherein m is a positive integer.

30. The one or more computer-readable non-transitory storage media of claim 19 wherein a size of said each index entry is one of 32 bytes or 64 bytes.

31. The one or more computer-readable non-transitory storage media of claim 19, wherein generating said XML tree index is performed in response to a request to generate said XML tree index on said XML document.

32. The one or more computer-readable non-transitory storage media of claim 19, wherein the instructions further cause:
   creating a path table index over nodes of said XML document; and
   storing, in said path table index, one or more path table index entries, each path table index entry comprising an XML tree index entry address corresponding to each node of the nodes of said XML document.

33. The one or more computer-readable non-transitory storage media of claim 19, wherein the XML tree index on said XML document is converted into an in-memory DOM object.

34. The one or more computer-readable non-transitory storage media of claim 19, wherein the instructions further cause:
   storing said XML tree index persistently in said database, wherein storing the XML tree index persistently in said database further comprises using semantic-aware compression to compress the XML tree index based on knowledge of a structure of said each index entry.

35. The one or more computer-readable non-transitory storage media of claim 19, wherein said XML tree index is comprised of a set of index pages;
   wherein an XML tree index page of said set of index pages is comprised of one or more index entries;
   wherein an index page has a one-to-one correspondence to a virtual memory page that is managed by an operating system; and
   wherein the instructions further cause controlling a working set size of virtual memory pages, wherein said virtual memory page contains one or more index pages.

36. The one or more computer-readable non-transitory storage media of claim 35, wherein the instructions further cause:
   receiving a request to add a new node to an existing XML document;
   retrieving a bitmap located on a page in the XML tree index for said existing XML document;
   using the bitmap to find a location within the page of an empty index entry; and inserting a new index entry into said location that corresponds to the new node.

37. The method of claim 1, wherein said database system is configured to only generate entries in said plurality of index entries that have a fixed-size.

38. The method of claim 1, wherein storing the entire plurality of index entries comprises storing the entire plurality of index entries in a single column of the single row of the table in said database.

* * * * *

UNITED STATES PATENT AND TRADEMARK OFFICE
CERTIFICATE OF CORRECTION

PATENT NO. : 10,698,953 B2
APPLICATION NO. : 13/604402
DATED : June 30, 2020
INVENTOR(S) : Novoselsky et al.

Page 1 of 1

It is certified that error appears in the above-identified patent and that said Letters Patent is hereby corrected as shown below:

On the Title Page

Column 2, item (57), under Abstract, Line 9, delete "descendent" and insert -- descendant --, therefor.

On page 2, Column 2, under Other Publications, Line 12, delete "Encironment"," and insert -- Environment", --, therefor.

In the Specification

In Column 2, Line 28, delete "23Jan. 2007)," and insert -- 23 Jan. 2007), --, therefor.

In Column 2, Line 54, delete "descendents" and insert -- descendants --, therefor.

In Column 3, Line 22, delete "{PurchaseOrder/" and insert -- {/PurchaseOrder/ --, therefor.

In Column 5, Line 9, delete "descendent" and insert -- descendant --, therefor.

In Column 8, Line 58, delete "descendents" and insert -- descendants --, therefor.

In Column 8, Line 59, delete "descendent" and insert -- descendant --, therefor.

In Column 8, Line 60, delete "descendents" and insert -- descendants --, therefor.

In Column 9, Line 7, delete "descendents" and insert -- descendants --, therefor.

In Column 9, Line 12, delete "descendent" and insert -- descendant --, therefor.

In Column 9, Line 35, delete "that that" and insert -- that --, therefor.

In Column 9, Line 35, delete "'a/b/c'." and insert -- '/a/b/c'. --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*